United States Patent
Cho

(10) Patent No.: US 7,908,417 B2
(45) Date of Patent: Mar. 15, 2011

(54) MOTHERBOARD SYSTEM, STORAGE DEVICE FOR BOOTING UP THEREOF AND CONNECTOR

(75) Inventor: Yung-Hsiang Cho, Taipei (TW)

(73) Assignee: Phison Electronics Corp., Miaoli (TW)

( * ) Notice: Subject to any disclaimer, the term of this patent is extended or adjusted under 35 U.S.C. 154(b) by 67 days.

(21) Appl. No.: 12/366,107

(22) Filed: Feb. 5, 2009

(65) Prior Publication Data

US 2010/0095044 A1 Apr. 15, 2010

(30) Foreign Application Priority Data

Oct. 15, 2008 (TW) ................................ 97139530 A

(51) Int. Cl.
G06F 13/00 (2006.01)
G06F 13/36 (2006.01)
G06F 13/20 (2006.01)
G06F 15/177 (2006.01)
G06F 9/00 (2006.01)

(52) U.S. Cl. ............. 710/300; 710/308; 710/313; 713/2
(58) Field of Classification Search .................. 710/300, 710/308, 313; 713/2
See application file for complete search history.

(56) References Cited

U.S. PATENT DOCUMENTS

| | | | | |
|---|---|---|---|---|
| 5,471,674 A | * | 11/1995 | Stewart et al. | 713/2 |
| 5,519,851 A | * | 5/1996 | Bender et al. | 710/301 |
| 5,987,605 A | * | 11/1999 | Hill et al. | 713/2 |
| 6,941,405 B2 | * | 9/2005 | Morrow | 710/305 |
| 7,401,243 B2 | * | 7/2008 | Knepper et al. | 713/322 |
| 7,406,591 B2 | * | 7/2008 | Rothman et al. | 713/2 |
| 7,457,897 B1 | * | 11/2008 | Lee et al. | 710/74 |
| 2006/0075395 A1 | * | 4/2006 | Lee et al. | 717/168 |
| 2006/0294290 A1 | * | 12/2006 | Raker et al. | 711/100 |
| 2006/0294355 A1 | * | 12/2006 | Zimmer et al. | 713/2 |
| 2007/0011491 A1 | * | 1/2007 | Govindarajan et al. | 714/27 |
| 2007/0277027 A1 | * | 11/2007 | Kim et al. | 713/1 |
| 2007/0283140 A1 | * | 12/2007 | Jones et al. | 713/2 |

(Continued)

FOREIGN PATENT DOCUMENTS

EP 1785855 A2 * 5/2007

(Continued)

OTHER PUBLICATIONS

Noergaard, Tammy, "Embedded Systems Architecture: A Comprehensive Guide for Engineers and Programmers", 2005, Elsevier Inc., pp. 191-194.*

(Continued)

*Primary Examiner* — Faisal M Zaman
(74) *Attorney, Agent, or Firm* — J.C. Patents

(57) ABSTRACT

A motherboard system is provided. The motherboard system includes a central processing unit (CPU), a control unit and an interface connector. The control unit is electrically connected to the CPU. The interface connector is electrically connected to the control unit and has a boot loader interface unit and a peripheral storage device interface unit, wherein the boot loader interface unit is electrically connected to the control unit and is configured for electrically connecting a system read only memory. When the power of the motherboard system is turned on, the CPU sends a read only memory fetch cycle to the control unit and fetches a booting program from the system read only memory configured in an external device via the boot loader interface unit. Accordingly, the system read only memory can be conveniently updated and maintained.

11 Claims, 3 Drawing Sheets

U.S. PATENT DOCUMENTS

| | | | |
|---|---|---|---|
| 2008/0062927 A1* | 3/2008 | Zhu et al. | 370/331 |
| 2008/0114977 A1* | 5/2008 | Lin et al. | 713/2 |
| 2008/0320181 A1* | 12/2008 | Lauterbach et al. | 710/38 |
| 2010/0180067 A1* | 7/2010 | Garcia et al. | 711/103 |
| 2010/0180110 A1* | 7/2010 | Mittapalli et al. | 713/100 |

FOREIGN PATENT DOCUMENTS

| | | | |
|---|---|---|---|
| JP | 2002190863 A | * | 7/2002 |
| JP | 2008262444 A | * | 4/2007 |
| JP | 2007193505 A | * | 8/2007 |
| JP | 2008176518 A | * | 7/2008 |

OTHER PUBLICATIONS

Lin et al., "A NAND Flash Memory Controller for SD/MMC Flash Memory Card," Feb. 2007, IEEE, IEEE Transactions on Magnetics, vol. 43, No. 2, pp. 933-935.*

Kumar et al., "A systems approach to verification using hardware acceleration," IEEE, Aug. 3-4, 2010, 2010 2nd Asia Symposium on Quality Electronic Design (ASQED), pp. 189-193.*

Min-Do et al., "A cost-effective 16-bit embedded flash MCU for digital multimedia applications," IEEE, 2000, Proceedings of the Second IEEE Asia Pacific Conference on ASICs, pp. 339-341.*

* cited by examiner

MOTHERBOARD SYSTEM, STORAGE DEVICE FOR BOOTING UP THEREOF AND CONNECTOR

CROSS-REFERENCE TO RELATED APPLICATION

This application claims the priority benefit of Taiwan application serial no. 97139530, filed on Oct. 15, 2008. The entirety of the above-mentioned patent application is hereby incorporated by reference herein and made a part of this specification.

BACKGROUND

1. Technology Field

The present invention relates to a motherboard system. More particularly, the present invention relates to a motherboard system that can be booted via a removable system read only memory, a flash memory storage device having the system read only memory, and a connector for connecting the motherboard system and the flash memory storage device.

2. Description of Related Art

During booting of a personal computer (PC) system, a booting program (for example, a basic input/output system (BIOS)) initiates hardware devices of the PC, detects functions of the hardware devices and booting an operation system of the PC. Generally, the booting program is stored in a memory that data stored therein cannot be lost during power-off, and such memory containing the booting program is generally referred to as a system read only memory (ROM). When the PC system is powered or reset, an address of a first command required to be executed by a central processing unit (CPU) thereof is pointed to the system ROM, so as to start the booting program.

To be specific, when the PC is powered, the CPU can execute a part of commands in the system ROM to initiate a unit and a main memory (for example, a dynamic random access memory (DRAM). Next, the CPU can load the remained booting command from the system ROM to the main memory of the PC, and executes the follow-up booting programs from the main memory.

The current system ROM is fixedly disposed on a motherboard system of the PC, and is connected to a south bridge chip of the unit via a low pin count (LPC) bus or a serial peripheral interface (SPI) bus. Conventionally, the system ROM is embodied by the ROM, so that data stored therein cannot be modified. However, as size and complexity of the booting program (for example, the BIOS) are continually increased, while the hardware is also frequently updated, the booting program has to be continually updated for supporting the new hardware. Therefore, an erasable programmable read only memory (EPROM) is widely used to embody the system ROM, so that a user can update the booting program. Though embodying the system ROM by the EPROM can facilitate the user to update the booting program while the hardware is updated, in the conventional technique, the EPROM is still fixedly disposed on the motherboard system, so that when a storage capacity thereof is not enough to store the updated booting program, updating of the booting program cannot be accomplished. Therefore, a novel motherboard system structure is required to be developed, by which the system ROM can be conveniently replaced.

SUMMARY

Accordingly, the present invention is related to a motherboard system, by which a removable system ROM can be accessed via an industry standard interface card, so as to conveniently update and maintain the system ROM and a booting program.

The present invention is directed to a flash memory storage device, which can provide a system ROM required for booting the aforementioned motherboard system in a removable approach, so as to conveniently update and maintain the system ROM and a booting program.

The present invention provides a motherboard system including a CPU, a control unit and an interface connector. The control unit is electrically connected to the CPU. The interface connector is electrically connected to the control unit and has a boot loader interface unit and a peripheral storage device interface unit, wherein the boot loader interface unit is electrically connected to the control unit and is used for electrically connecting a system ROM. When the motherboard system is powered, the CPU sends a ROM fetch cycle to the control unit and fetches a booting program from the system ROM via the boot loader interface unit.

The present invention provides a flash memory storage device including a card connector, a flash memory controller, a flash memory chip and a system ROM. The card connector is used for connecting a motherboard system, wherein the Peripheral Component Interconnect (PCI) Express card connector has a boot loader interface unit and a peripheral storage device interface unit. The flash memory controller is electrically connected to the peripheral storage device interface unit of the card connector. The flash memory chip is electrically connected to the flash memory controller. The system ROM is electrically connected to the boot loader interface unit of the card connector, wherein the system ROM has a booting program used for booting the motherboard system.

The present invention provides a connector including a peripheral storage device interface unit and a boot loader interface unit. The peripheral storage device interface unit is electrically connected to a control chip and a storage device, and the boot loader interface unit is used for connecting the control chip and a system ROM, wherein the system ROM is disposed on the storage device.

In the present invention, since the removable system ROM is applied, and is connected to the motherboard system via the industry standard interface card, the booting program in the system ROM can be effectively updated and maintained.

In order to make the aforementioned and other objects, features and advantages of the present invention comprehensible, a preferred exemplary embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF EXEMPLARY EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
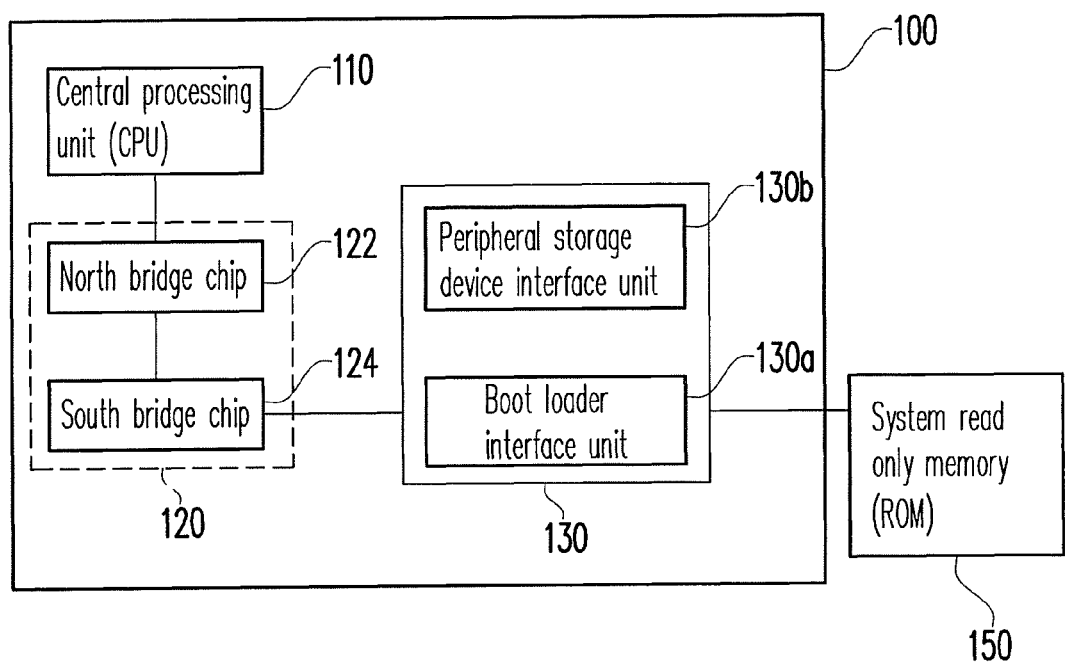
FIG. 1 is a schematic block diagram illustrating a motherboard system according to an exemplary embodiment of the present invention.

FIG. 1 is a schematic block diagram illustrating a motherboard system according to an exemplary embodiment of the present invention.

Referring to FIG. 1, the motherboard system 100 is disposed in a computer (not shown), and is used for connecting related components of the computer. The motherboard system 100 includes a CPU 110, a control unit 120 and an interface connector 130.

The CPU 110 interprets commands executed on the motherboard system 100 to control operations of the components connected to the motherboard system 100.

The control unit 120 is electrically connected to the CPU 110, and connects the CPU 110 to the other devices on the motherboard system 100. In the present exemplary embodiment, the control unit 120 could be a chipset and includes a north bridge chip 122 and a south bridge chip 124, though it should be noted that in another exemplary embodiment of the present invention, the control unit 120 can also be embodied by a single chip integrated with functions of the north bridge chip and the south bridge chip.

The north bridge chip 122 is electrically connected to the CPU 110, and processes high speed signals. For example, the high speed signals include communications among the CPU, the south bridge chip, a main memory (for example, a DRAM), an accelerated graphics port (AGP) or a PCI Express port.

The south bridge chip 124 is electrically connected to the north bridge chip 122, and processes low speed signals. The south bridge 124 is connected to the CPU 110 via the north bridge 122. For example, the low speed signals include communications among a peripheral device interface, a multimedia controller and a communication interface. In the present exemplary embodiment, the south bridge chip 124 has functions of a peripheral component interconnect (PCI) controller, an advanced technology attachment (ATA) controller, a universal serial bus (USB) controller, a network controller and a sound controller.

The interface connector 130 is electrically connected to the control unit 120. In the present exemplary embodiment, the interface connector 130 is a PCI Express connector (the interface connector 130 is referred to as the PCI Express connector 130, hereinafter), which is used for connecting the peripheral devices having the PCI Express interface (for example, a storage device). Particularly, the PCI Express connector 130 is a mini-card electromechanical (MiniCEM) connector accorded to a PCI Express interface standard. However, it should be noted that the present invention is not limited thereto, and in another exemplary embodiment of the present invention, the PCI Express connector 130 can also be a CEM connector or an ExpressCard connector accorded to the PCI Express interface standard, or other PCI Express connectors accorded to a form factor of the PCI Express interface standard. Moreover, the connectors with a Parallel Advanced Technology Attachment (PATA) interface, a Serial Advanced Technology Attachment (SATA) interface, a small computer system interface (SCSI) or other industry standard interfaces can also be applied.

In the present exemplary embodiment, the PCI Express connector 130 includes a boot loader interface unit 130a and a peripheral storage device interface unit 130b.

The boot loader interface unit 130a is electrically connected to the south bridge chip 124, which can facilitate the CPU 110 to identify the system ROM 150, wherein a firmware resides in the system ROM 150. Namely, when the computer is powered, the CPU 110 can send a ROM fetch cycle to fetch a first booting command of the booting program stored in the system ROM 150 via the south bridge chip 124. According to a current chip set design, the boot loader interface unit 130a is a mechanism for the motherboard system 100 to identify the system ROM 150. Therefore, the ROM fetch cycle can be smoothly transmitted to the system ROM connected to the south bridge chip 124 via the boot loader interface unit 130a, so as to fetch the booting program. In the present exemplary embodiment, the boot loader interface unit 130a is a SPI bus, though it should be understood that the present invention is not limited thereto, and in another exemplary embodiment of the present invention, the boot loader interface unit 130a can also just have necessary pins of the SPI, or can be interfaces of ISA, LPC or other suitable interfaces suitable for transmitting the system firmware.

In the present exemplary embodiment, the booting program in the system ROM is a basic input/output system (BIOS). Moreover, in another exemplary embodiment of the present invention, the booting program in the system ROM can also be an extensible firmware interface.

The peripheral storage device interface unit 130b is electrically connected to the south bridge chip 124. In the present exemplary embodiment, the peripheral storage device interface unit 130b is a PCI Express interface bus, so that the interface connector 130 (i.e. the PCI Express connector 130) can be connected to the peripheral devices (for example, a storage device) compatible to the PCI Express interface. In another exemplary embodiment, the peripheral storage device interface unit 130b only has the necessary pins of the PCI Express interface bus. Related specifications of the PCI Express interface are known by those skilled in the art, and detailed descriptions thereof are not repeated.

Particularly, since according to a MiniCEM specification, pins 45, 47, 49 and 51 are remained non-functional, in the present exemplary embodiment, the pins 45, 47, 49 and 51 in the PCI Express connector 130 compatible to the MiniCEM is laid out as the boot loader interface unit 130a.

Figure 2:
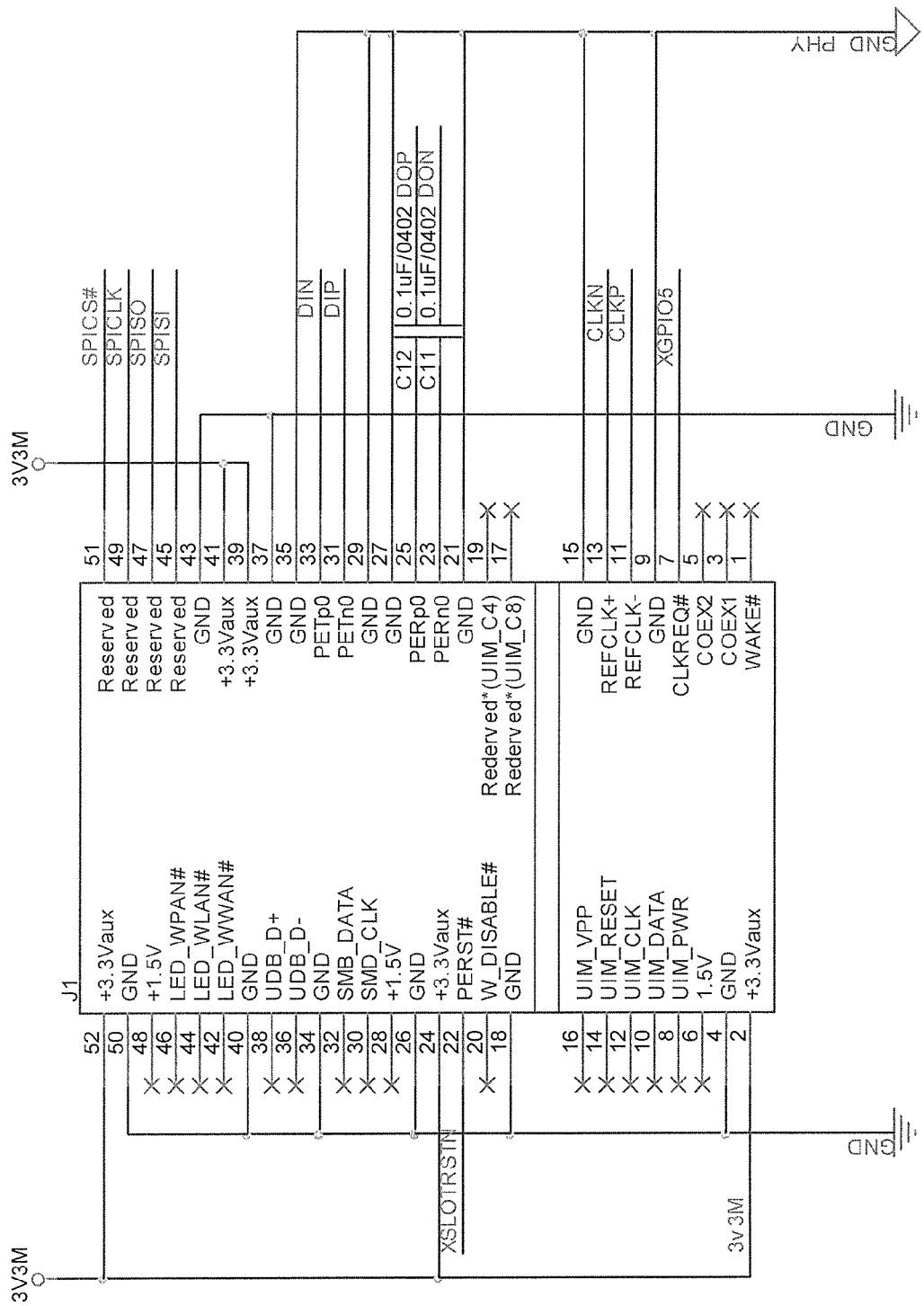
FIG. 2 is a schematic diagram illustrating pins for PCI Express MiniCEM goldfingers of a PCI Express connector according to an exemplary embodiment of the present invention.

FIG. 2 is a schematic diagram illustrating pins for PCI Express MiniCEM goldfingers of the PCI Express connector 130 according to an exemplary embodiment of the present invention.

Referring to FIG. 2, the remained pins 45, 47, 49 and 51 of the PCI Express MiniCEM goldfingers are respectively arranged as a SPISI pin, a SPISO pin, a SPICLK pin and a SPICS# pin of the serial peripheral interface, and the other PCI Express MiniCEM goldfingers are the PCI Express interface pins. Accordingly, in the present exemplary embodiment, the PCI Express connector 130 substantially has a form factor as that of the MiniCEM, so that the PCI Express connector 130 can be connected to the peripheral devices having the MiniCEM. Moreover, for signal transmission, the PCI Express connector 130 can receive and transmit signals compatible to the PCI Express interface standard and signals compatible to the serial peripheral interface standard.

Moreover, though not illustrated in FIG. 1, the motherboard system 100 can further include other expansion slots (for example, PCI, ISA, USB and SATA connectors, etc.) connected to the south bridge chip 124 or the north bridge chip 122 for connecting a display card, a infrared module, a bluetooth module or a network card, etc.

As described above, in the present exemplary embodiment, the system ROM 150 is connected to the motherboard system 100 via the boot loader interface unit 130a in the PCI Express connector 130. Therefore, the system ROM 150 can be disposed on an external device having the PCI Express interface, so as to removably be connected to the motherboard system 100 via the peripheral device. Namely, the system ROM 150 can be disposed on the external device having the PCI Express card connector (i.e. a male connector of the PCI Express interface), and is connected to the south bridge chip 124 via the PCI Express connector 130 (i.e. a female connector of the PCI Express interface), so that the ROM fetch cycle can smoothly identify the system ROM 150 via the south bridge chip 124 and the boot loader interface unit 130a, so as to fetch the booting program (for example, the BIOS). In the following content, the external device is described in detail with reference of FIG. 3.

Figure 3:
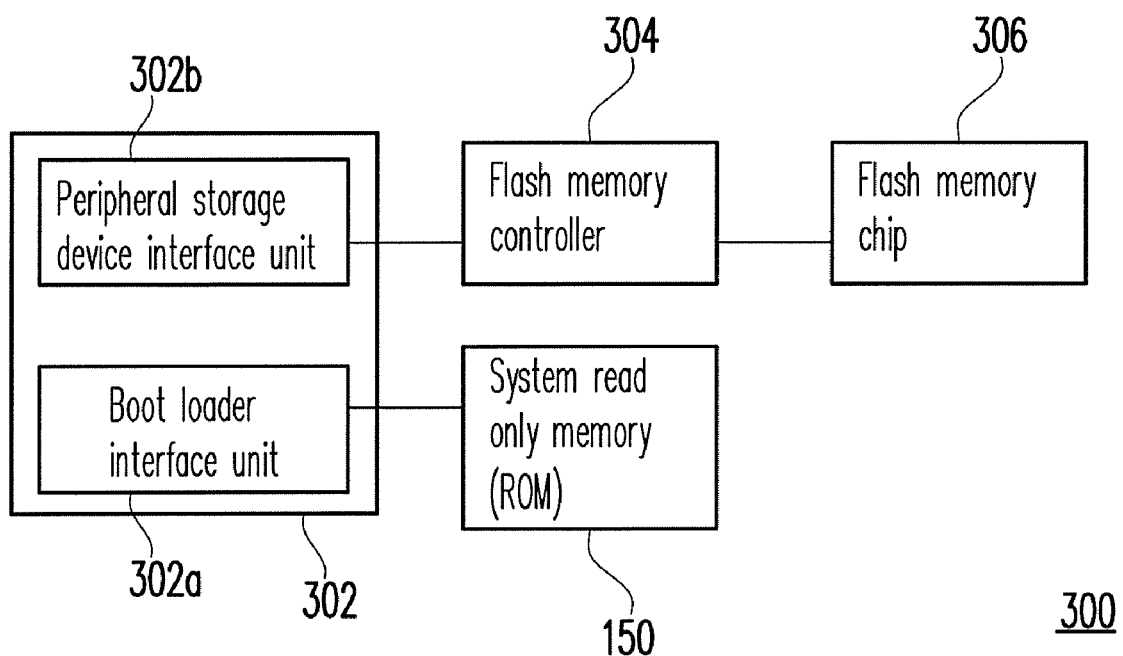
FIG. 3 is a schematic block diagram illustrating an external device having a PCI Express card connector according to an exemplary embodiment of the present invention.

FIG. 3 is a schematic block diagram illustrating an external device having the PCI Express card connector according to an exemplary embodiment of the present invention. The external device is, for example, a flash memory storage device.

Referring to FIG. 3, the flash memory storage device 300 includes a card connector 302, a flash memory controller 304 and a flash memory chip 306, and the system ROM 150 of FIG. 1 is disposed on the flash memory storage device 300.

The card connector 302 may connect the motherboard system 100. The card connector 302 corresponds to the PCI Express connector 130 of the motherboard system 100. Therefore, in the present exemplary embodiment, the card connector 302 is the PCI Express card connector, and has the form factor as that of the MiniCEM (the card connector 302 is referred to as the PCI Express card connector 302, hereinafter). Though the present invention is not limited thereto, and the card connector 302 can also be a CEM connector, an ExpressCard connector accorded to the PCI Express interface standard, other connectors accorded to a form factor of the PCI Express interface standard, or other industry standard connectors.

Particularly, the PCI Express card connector 302 also has a boot loader interface unit 302a and a peripheral storage device interface unit 302b, wherein the boot loader interface unit 302a may electrically connect the boot loader interface unit 130a of the PCI Express connector 130, and the peripheral storage device interface unit 302b may electrically connect the peripheral storage device interface unit 130b of the PCI Express connector 130. Therefore, in the present exemplary embodiment, the boot loader interface unit 302a corresponds to the serial peripheral interface bus, and the peripheral storage device interface unit 302b corresponds to the PCI Express interface bus. Arrangement of the pins of the PCI Express card connector 302 is the same as that shown in FIG. 2, and detailed description thereof is not repeated.

The flash memory controller 304 is electrically connected to the peripheral storage device interface unit 302b of the PCI Express card connector 302. The flash memory controller 304 may receive an access command from the motherboard system 100 for accessing the flash memory chip 306. Generally, the flash memory controller 304 includes a micro-processing unit, a memory management module, a flash memory interface module, a buffer memory, a host interface module, an error checking and correcting module and a power management module, etc.

The flash memory chip 306 is electrically connected to the flash memory controller 304, and the flash memory chip 306 is accessed according a control command of the flash memory controller 304. In the present exemplary embodiment, the flash memory chip 306 is a multi level cell (MLC) NAND flash memory chip. However, it should be noted that the present invention is not limited thereto. In another exemplary embodiment of the present invention, a single level cell (SLC) NAND flash memory chip can also be applied.

The system ROM 150 is electrically connected to the boot loader interface unit 302a of the PCI Express card connector 302. As described above, the system ROM has the booting program used for booting the motherboard system 100.

According to the structures shown in FIG. 1 and FIG. 3, when the flash memory storage device 300 is connected to the motherboard system 100 via the PCI Express card connector 302 and the PCI Express connector 130, and when the motherboard system 100 is powered, the CPU 110 can send the ROM fetch cycle to the control unit (i.e. the north bridge chip 122 and the south bridge chip 124). The ROM fetch cycle is transmitted to the north bridge chip 122 via a bus between the CPU 110 and the north bridge chip 122. Then, the ROM fetch cycle is transmitted to the south bridge chip 124 via a bus between the north bridge chip 122 and the south bridge chip 124. Then, the south bridge chip identifies the boot loader interface unit 130a and the boot loader interface unit 302a, and fetches the first booting command of the booting program from the system ROM 150, and transmits it to the CPU 110. Next, the CPU 110 repeatedly sends the ROM fetch cycle according to the above paths for fetching the entire booting program, and then executes the fetched booting program to accomplish booting of the computer.

Generally, the motherboard system 100 can further includes a main memory (not shown) connected to the north bridge chip 122, and since the main memory is a DRAM with accessing speed thereof faster than that of the ROM, in this case, the CPU 110 can fetch and execute a part of the booting program from the system ROM for initiating the main memory, and then stores the follow-up fetched booting program into the main memory for execution, so as to improve a speed of executing the booting program.

It should be noted that since the PCI Express connector 130 of the motherboard system 100 is electrically connected to the south bridge chip 124, the flash memory controller 304 and the system ROM 150 all receive the control command from the south bridge chip 124. However, since the north bridge chip 122 can also identify the PCI Express interface, in another exemplary embodiment of the present invention, the boot loader interface unit 130a of the PCI Express connector 130 can also be electrically connected to the south bridge chip 124, and the peripheral storage device interface unit 130b can be electrically connected to the north bridge chip 122. In this case, the flash memory controller 304 receives the control command from the north bridge chip 122, and the system ROM 150 receives the control command from the south bridge chip 124.

Moreover, though in the present invention, the PCI Express interface standard is taken as an example, the present invention is not limited thereto, and any other suitable industry standard connectors, such as PATA, SATA, SCSI, etc. can also be applied.

In summary, the system ROM is disposed on the external device removably connected to the motherboard system, so that a user can easily replace the system ROM or maintain the system ROM by disassembling the external device. By such means, update of the system firmware of the computer system can be more flexible.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A motherboard system, comprising:
a central processing unit (CPU);
a control unit, electrically connected to the CPU; and
a Peripheral Component Interconnect (PCI) Express connector, electrically connected to the control unit, wherein the PCI Express connector having a boot loader interface unit and a peripheral storage device interface unit, wherein the boot loader interface unit is electrically connected to the control unit and is configured for connecting a system read only memory (ROM) and the peripheral storage device interface unit is a PCI Express interface bus,
wherein the CPU sends a ROM fetch cycle to the control unit and fetches a booting program from the system ROM via the boot loader interface unit,
wherein the PCI Express connector comprises:
a first pin, configured to receive an input signal corresponding to a serial peripheral interface (SPI) standard;
a second pin, configured to receive an output signal corresponding to the serial peripheral interface standard;
a third pin, configured to receive a clock signal corresponding to the serial peripheral interface standard; and
a fourth pin, configured to receive a chip select signal corresponding to the serial peripheral interface standard,
wherein the boot loader interface unit is consisted of the first pin, the second pin, the third pin, and the fourth pin.

2. The motherboard system according to claim 1, wherein the control unit comprises:
a north bridge chip, electrically connected to the CPU; and
a south bridge chip, electrically connected to the north bridge chip.

3. The motherboard system according to claim 2, wherein the PCI Express interface bus is electrically connected to the north bridge chip.

4. The motherboard system according to claim 2, wherein the PCI Express interface bus is electrically connected to the south bridge chip.

5. The motherboard system according to claim 1, wherein the PCI Express connector is a PCI Express interface card electromechanical (CEM) connector, a PCI Express mini-CEM connector or an ExpressCard connector.

6. The motherboard system according to claim 1, wherein the booting program comprises a basic input/output system (BIOS) or an extensible firmware interface.

7. The motherboard system according to claim 1, further comprising a flash memory storage device, wherein the flash memory storage device is removably and electrically connected to the PCI Express connector, and the system ROM is disposed on the flash memory storage device.

8. The motherboard system according to claim 7, wherein the flash memory storage device comprises:
a PCI Express card connector, removably and electrically connected to the PCI Express connector;
a flash memory controller, electrically connected to the PCI Express card connector, and is electrically connected to the control unit via the PCI Express interface bus; and
a flash memory chip, electrically connected to the flash memory controller,
wherein the system ROM is electrically connected to the PCI Express card connector and is electrically connected to the control unit via the serial peripheral interface bus.

9. A flash memory storage device, comprising:
a card connector, for connecting a motherboard system, wherein the card connector is a PCI Express card connector having a boot loader interface unit and a peripheral storage device interface unit;
a flash memory controller, electrically connected to the peripheral storage device interface unit;
a flash memory chip, electrically connected to the flash memory controller; and
a system ROM, electrically connected to the boot loader interface unit, wherein the system ROM has a booting program for booting the motherboard system,
wherein the PCI Express connector comprises:
a first pin, configured to receive an input signal corresponding to a serial peripheral interface (SPI) standard;
a second pin, configured to receive an output signal corresponding to the serial peripheral interface standard;
a third pin, configured to receive a clock signal corresponding to the serial peripheral interface standard; and
a fourth pin, configured to receive a chip select signal corresponding to the serial peripheral interface standard,
wherein the boot loader interface unit is consisted of the first pin, the second pin, the third pin, and the fourth pin.

10. The flash memory storage device according to claim 9, wherein the PCI Express card connector is a PCI Express interface CEM connector, a PCI Express mini-CEM connector or an ExpressCard connector.

11. The flash memory storage device according to claim 9, wherein the booting program comprises a BIOS or an extensible firmware interface.

* * * * *